(12) United States Patent
Buchin (10) Patent No.: US 8,690,692 B2
(45) Date of Patent: Apr. 8, 2014

(54) TRANSMISSION SHAFT FOR TRANSMITTING ROTATIONAL MOVEMENTS AND/OR FORCES, AND METHOD FOR MANUFACTURING SAID SHAFT

(75) Inventor: Jean-Michel Buchin, Lons le Saunier (FR)

(73) Assignee: SKF Aerospace France, Saint-Vallier-sur-Rhone (FR)

( * ) Notice: Subject to any disclaimer, the term of this patent is extended or adjusted under 35 U.S.C. 154(b) by 6 days.

(21) Appl. No.: 13/348,365

(22) Filed: Jan. 11, 2012

(65) Prior Publication Data

US 2012/0184383 A1 Jul. 19, 2012

(30) Foreign Application Priority Data

Jan. 14, 2011 (FR) ...................... 11 50314

(51) Int. Cl.
*F16D 3/00* (2006.01)
(52) U.S. Cl.
USPC .......................................... 464/181; 464/182
(58) Field of Classification Search
USPC .......................................... 464/181–183, 903
See application file for complete search history.

(56) References Cited

U.S. PATENT DOCUMENTS

| 4,380,443 A | * | 4/1983 | Federmann et al. | .......... 464/181 |
| 4,605,385 A | | 8/1986 | Pueck et al. | |
| 4,681,556 A | | 7/1987 | Palmer | |
| 4,704,918 A | | 11/1987 | Orkin | |
| 5,605,507 A | | 2/1997 | Huvey et al. | |
| 5,683,300 A | | 11/1997 | Yasui et al. | |

FOREIGN PATENT DOCUMENTS

| EP | 0 046 869 A1 * | 3/1982 | ................. 464/181 |
| EP | 0668446 A1 | 8/1995 | |
| SU | 1682656 A1 * | 10/1991 | ................. 464/181 |

* cited by examiner

*Primary Examiner* — Gregory Binda
(74) *Attorney, Agent, or Firm* — Dowell & Dowell, PC (57) ABSTRACT

A transmission shaft for transmitting rotational movements including a tubular body having at least one tubular composite assembly including a plastic matrix and strengthening elements, at least one insert positioned at one end of the body and which is secured to the body in an interface area between the insert and the composite assembly, and at least one slug passing radially through the insert and the body for keeping the strengthening elements in place. The at least one insert has at least one recess receiving a part of the strengthening elements to maintain the strengthening elements in the interface area.

5 Claims, 8 Drawing Sheets

TRANSMISSION SHAFT FOR TRANSMITTING ROTATIONAL MOVEMENTS AND/OR FORCES, AND METHOD FOR MANUFACTURING SAID SHAFT

BACKGROUND OF THE INVENTION

1. Field of the Invention

The present invention relates to a transmission shaft for transmitting rotational movements and/or forces, also commonly called a torque shaft. The invention also relates to a method for manufacturing such a shaft.

The field of the invention is more particularly that of shafts made from composite materials. In a known manner, such a composite shaft comprises a body made from a plastic matrix, in particular a thermoplastic or thermosetting resin, incorporating mechanical strengthening elements, in particular fibers.

2. Brief Description of the Prior Art

This type of shaft is used in the aeronautic and automobile industries to support different functional mechanical assemblies, actuated or stressed during the rotation of the shaft. For example, such a shaft can be used to deploy the leading edge and trailing edge flaps of airplane wings, so as to increase the lift thereof, or to orient the airplane door latches, so as to make it possible to open and close those doors. According to another example, such a shaft can constitute an automobile steering column.

In practice, to avoid deteriorating the composite material of the body, the aforementioned mechanisms are not directly supported by the bodies, but by metal tubular inserts secured to the longitudinal ends of the body and providing the mechanical connection between the body and the mechanisms, such as in U.S. Pat. No. 4,681,556 for example. However, during the torsion of the shaft, and therefore the transmission of forces by the insert between the body and the mechanisms, the shaft undergoes major stresses in an interface area between each insert and the body. These stresses in particular include a shearing component and, over an extended period of time, can cause a deterioration of the plastic matrix in the interface area with the insert.

Furthermore, following their manufacture, certain torque shafts have a reduced quantity of fibers in the interface area between the body and the insert(s), so that a weakening of the shaft during operation can be observed in that area.

SUMMARY OF THE INVENTION

The aim of the present invention is therefore to propose a composite transmission shaft whereof the mechanical torsion performance is improved, in particular in the interface area between the body and the insert(s).

To that end, the invention relates to a transmission shaft transmitting rotational movements and/or forces, comprising:
- a tubular body elongated along a longitudinal axis between two ends, comprising at least one tubular composite assembly, including a plastic matrix and strengthening elements,
- at least one insert, which is positioned at one of the longitudinal ends of the body and which is mechanically secured to the body in an interface area between the insert and the composite assembly, and
- in the or each interface area, at least one slug passing radially through the insert and the body, wherein the strengthening elements at least partially surround the at least one slug such that the at least one slug keeps the strengthening elements in place in the interface area during the manufacture of the shaft and/or when forces are exerted on the shaft, and wherein the at least one insert comprises at least one recess receiving at least one part of the strengthening elements surrounding the at least one slug, so as to axially and/or tangentially maintain said strengthening elements between the at least one recess and the at least one slug in the interface area.

In this way, the invention makes it possible to improve the mechanical strength of the torque shaft and the distribution of the strengthening elements, in particular at its ends receiving most of the operating stresses. During the manufacture of the shaft, the presence of the slugs makes it possible to keep the strengthening elements in the interface area, so as to prevent those strengthening elements from being distributed in a non-satisfactory manner in that area. During operation, when the shaft transmits the rotational movements and/or forces, the slugs retain the fibers and minimize the stresses transmitted to the resin, which increases the lifetime of the shaft.

According to other advantageous features of the invention, considered alone or in combination:
- The at least one insert comprises a tubular portion centered on a central axis, having a first outer diameter, and an annular portion coaxial to the tubular portion, having a second outer diameter larger than the first outer diameter and whereof one side oriented toward the tubular portion in the axial direction of the insert is provided with the at least one recess.
- For each recess formed in the annular portion of the at least one insert, an opening for receiving a slug is radially defined in the tubular portion of the insert and is substantially aligned with the recess in the axial direction of the at least one insert.
- The at least one insert comprises toothed elements, which include the at least one recess and which are distributed along the periphery of the insert, on the side of the annular portion oriented toward the tubular portion.
- The shaft comprises reversible locking means for locking the at least one slug in the interface area, the at least one slug can be removed from the shaft at rest when the locking means are unlocked, and the at least one insert can be removed from the shaft at rest when the at least one slug passing through said insert and the body has been removed from the shaft.
- The at least one insert is passed through by several slugs radially distributed around the body, preferably six slugs.

The invention also relates to a method for manufacturing a transmission shaft for transmitting the rotational movements and/or forces. The method comprises the following steps:
a) positioning at least one end member at one of the ends of a tube;
b) positioning at least one slug through the tube and the at least one end member in an interface area;
c) winding the strengthening elements around the tube, at least partially surrounding the at least one slug in the interface area;
d) forming a plastic matrix incorporating the strengthening elements around the tube and the interface area where the at least one slug is located, so as to produce a composite assembly belonging to the shaft.

In step c), the strengthening elements are wound, in the interface area, between the at least one slug and a recess that is formed on the end member opposite said slug.

Preferably, in step c), the strengthening elements are wound around the tube while forming a helix inclined by an angle comprised between 20 and 70° relative to the longitudinal axis of the tube.

Also preferably, in step c), the strengthening elements are wound around the tube while forming a helix inclined by an angle equal to 45° relative to the longitudinal axis of the tube.

Advantageously, the manufacturing method also comprises a step e) consisting of removing the at least one slug corresponding to the or one of the end members; removing said end member from the shaft; and replacing said end member with an insert adapted to the shaft.

BRIEF DESCRIPTION OF THE DRAWINGS

The invention will be better understood upon reading the following description, provided solely as a non-limiting example and done in reference to the drawings, in which.

DESCRIPTION OF THE PREFERRED EMBODIMENTS

Figure 1:
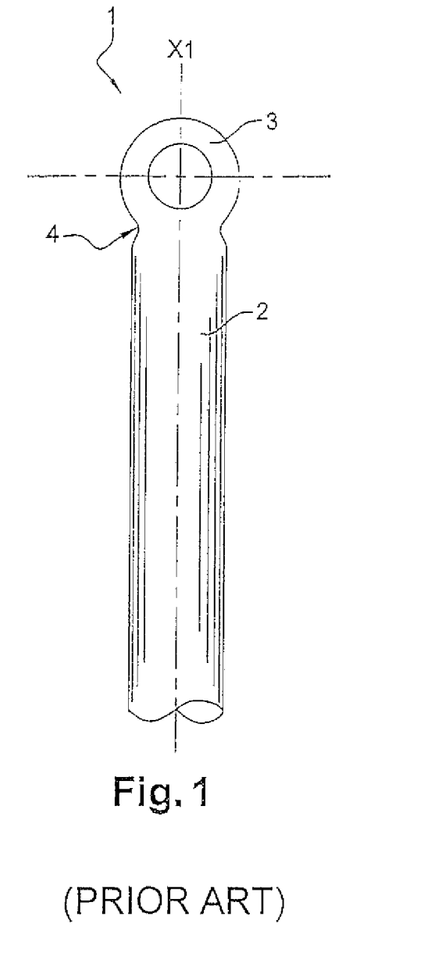
FIGS. 1 and 2 are diagrammatic illustrations of an existing torque shaft, not according to the invention.
Figure 2:
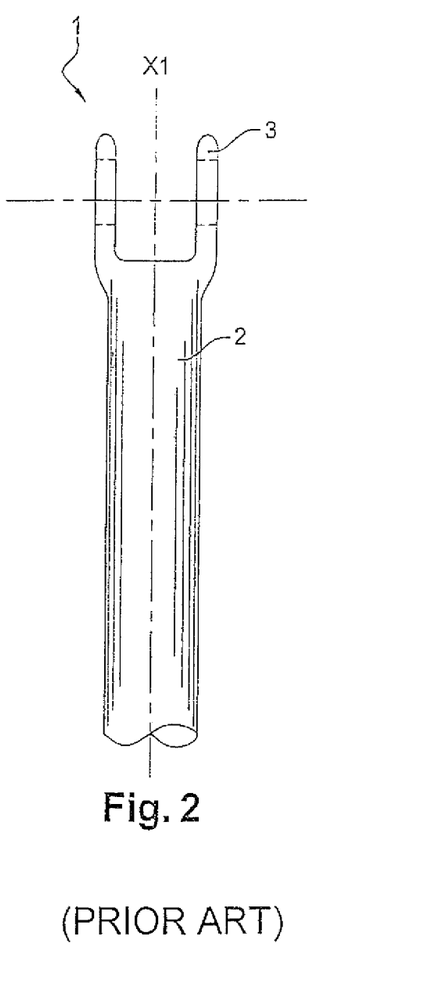

FIGS. 1 and 2 show an existing torque shaft 1, which the present invention aims to improve.

The shaft 1 comprises an elongate body 2 made from a composite material, in particular including a plastic matrix and strengthening fibers. The body 2 is secured to an end insert 3 made from metal, with an interface area 4 between the body 2 and the insert 3. The shaft 1 has, in the area 4, a weakening that is due on the one hand to a lack of strengthening fibers and, on the other hand, to the transition between the composite material of the body 2 and the metal material of the insert 3, so that the mechanical torsion performance of the shaft 1 is not satisfactory. In particular, the strength of the shaft 1 during prolonged operation is insufficient.

FIGS. 3 to 7 show a torque shaft 10 according to the invention.

The shaft 10 comprises a body 12, including a tube 20 and a composite assembly 30, two end inserts 40, and several slugs 70.

The body 12 is elongated along a longitudinal axis X10 between two ends 16 and 18. This body 12 is formed by the composite assembly 30 formed around the tube 20, as detailed below relative to FIGS. 3, 6 and 7.

Figure 3:
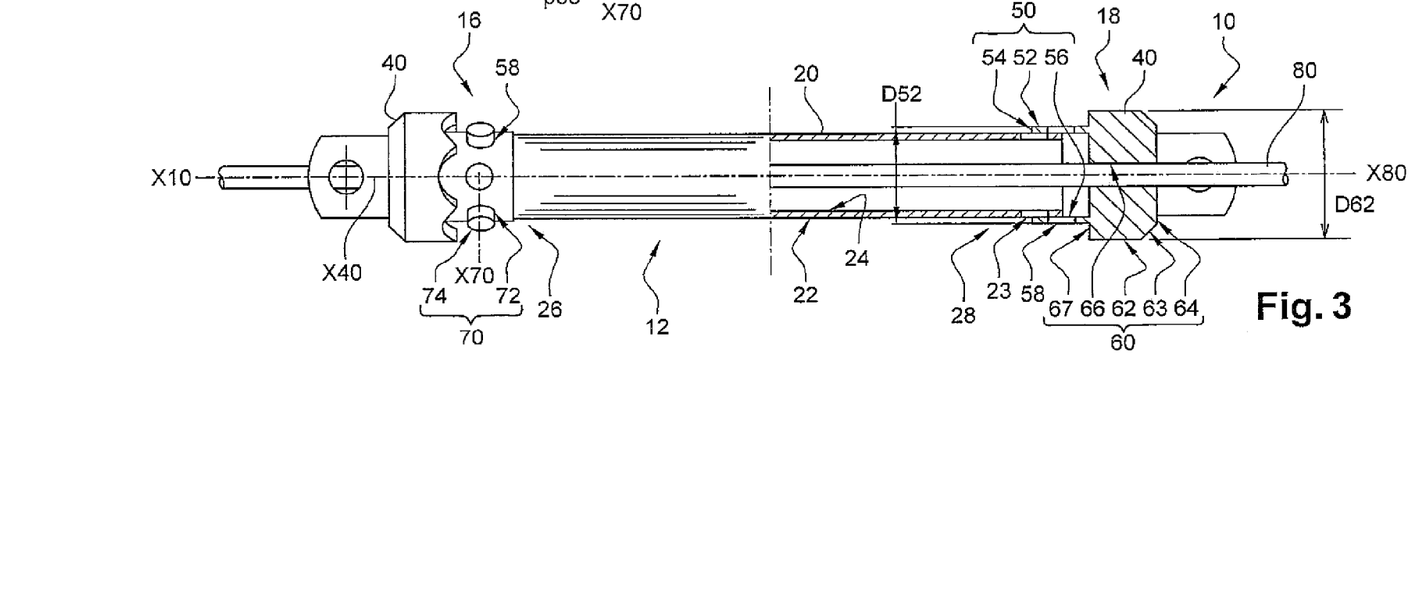
FIG. 3 is an elevation view, including a partial cross-section on its right side, of the shaft according to the invention, at the beginning of manufacturing.

As shown in FIG. 3, the tube 20 is elongated along the longitudinal axis X10 between two ends 26 and 28. The tube 20 comprises an outer cylindrical surface 22 and an inner bore 24, centered on the axis X10. The tube 20 also comprises openings 23 for receiving the slugs 70, which pass through the tube 20 between the surface 22 and the bore 24, radially to the axis X10, at its ends 26 and 28. The tube 20 is rigid, preferably made from metal or a metal alloy, in particular aluminum or a fusible metal alloy with a low melting point. Alternatively, the tube 20 can be made from rigid plastic.

Figure 6:
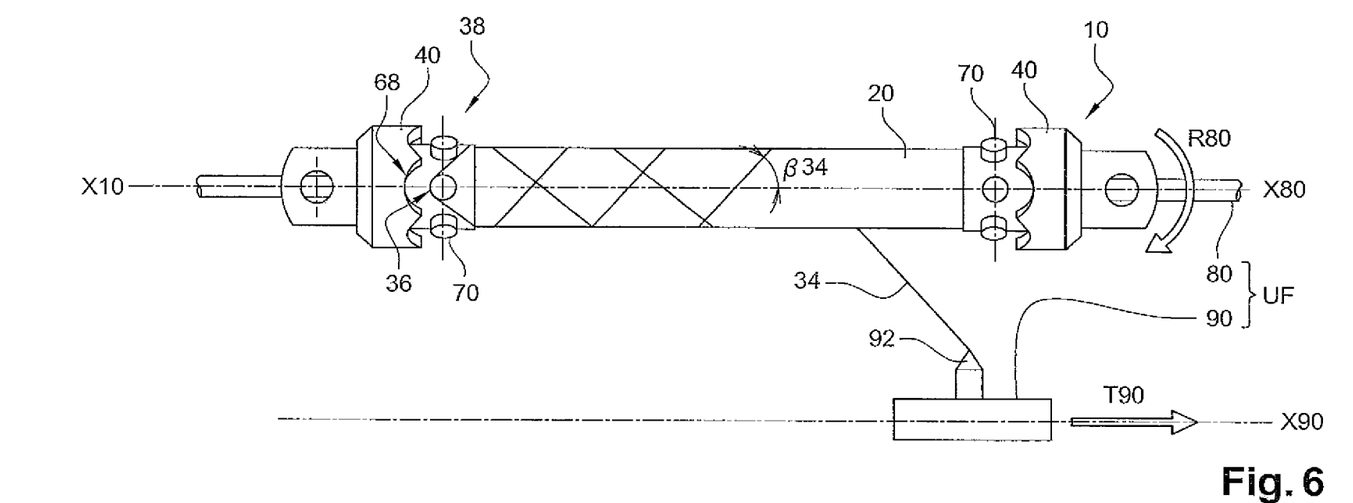
FIG. 6 is a view similar to FIG. 3, showing the shaft during manufacturing.
Figure 7:
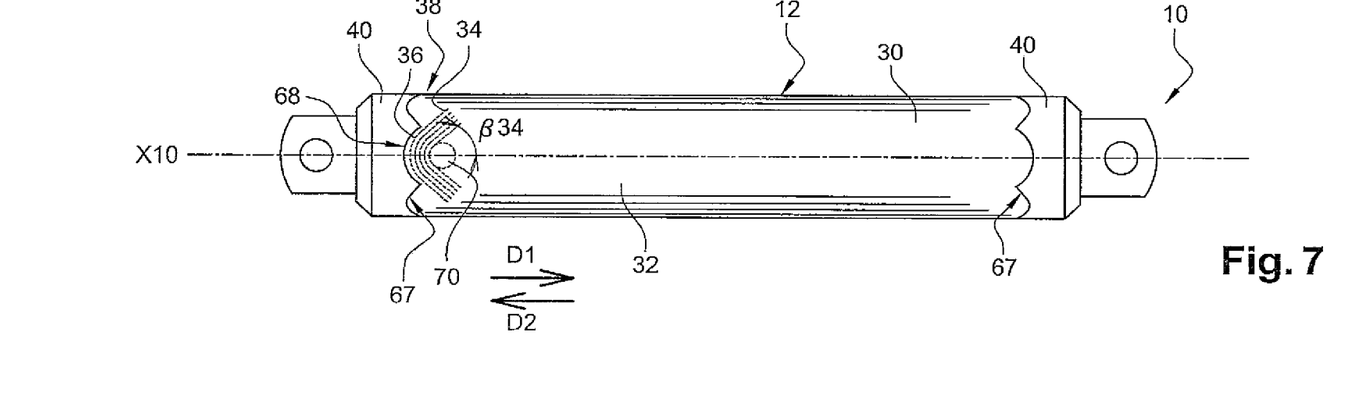
FIG. 7 is a view similar to FIG. 3, showing the shaft when its manufacturing is finished.

As shown in FIGS. 6 and 7, the composite assembly 30 comprises a plastic matrix 32, preferably made from epoxy resin or thermoplastic resin of the polyethylenimine PEI, polyphenylene sulfide PPS, or polyetheretherketone PEEK type, as well as strengthening elements 34, in particular carbon, glass, aramide or plant fibers. The assembly 30 is formed around the tube 20, with the fibers 34 that are integrated into the resin 32. The composite assembly 30 cooperates with each of the inserts 40 at an interface area 38, so as to secure the body 12 of the shaft 10 with each insert 40. In that area 38, the fibers 34 have a winding 36 around the slugs 70.

Figure 4:
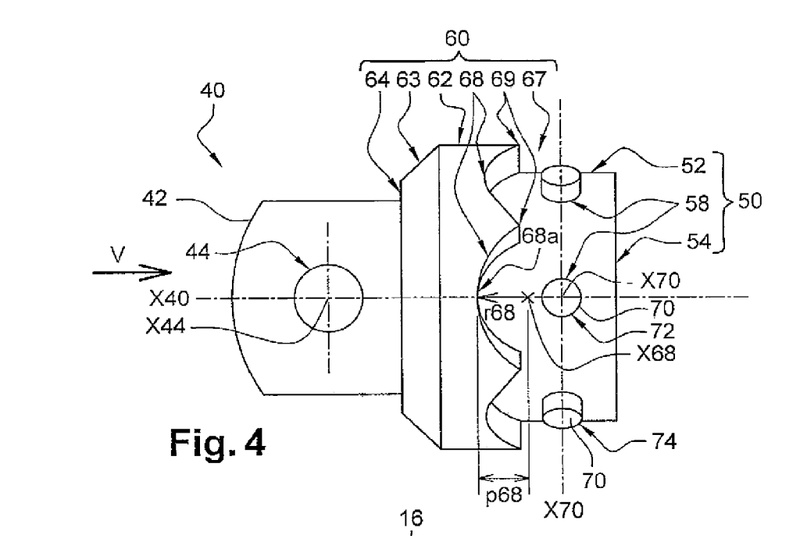
FIG. 4 is an elevation view of an insert equipping the shaft of FIG. 3.

As shown in particular in FIGS. 3, 4 and 6, there are six slugs 70, radially distributed around the insert 40, in the interface area 38 with the composite assembly 30. Each slug 70 has a cylindrical shape elongated along an axis X70, with an outer cylindrical surface 72 and an end 74. As detailed below, each insert 40 can comprise a different number of slugs 70.

Figure 5:
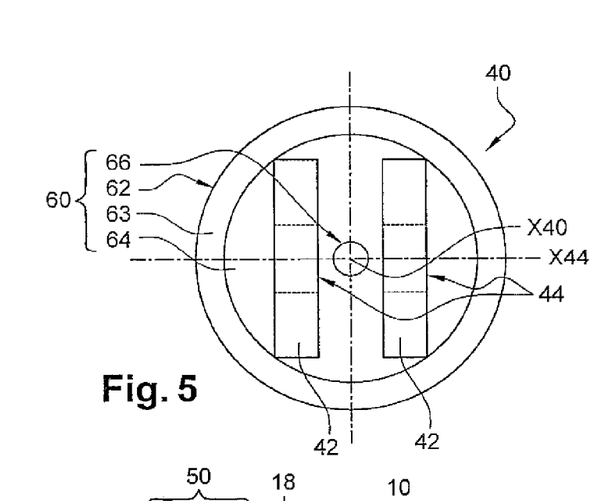
FIG. 5 is a view along arrow V of FIG. 4.

As shown in FIGS. 3 to 5, the insert 40 comprises a tubular portion 50 and an annular portion 60, centered on a longitudinal axis X40 of the insert 40. On the side axially opposite the tubular portion 50, the insert 40 also comprises branches 42 provided with openings 44, making it possible to connect the shaft 10 to a mechanism that is not shown. The branches 42 extend parallel on either side of the axis X40, while the openings 44 pass through the branches 42 along an axis X44 perpendicular to the axis X40. The insert 40 is rigid, preferably made from metal or a metal alloy, in particular aluminum, steel, stainless steel, or titanium. Alternatively, the insert 40 can be made from plastic.

In one alternative that is not shown, the insert 40 can have, without restriction, any shape adapted to this application. In particular, the outer shape of the insert 40, corresponding to the branches 42 in FIGS. 3 to 7, is adapted to the interface of the mechanism cooperating with the shaft 10.

The tubular portion 50 comprises an outer cylindrical surface 52 and an inner bore 56, which are centered on the axis X40 and connected by a radial annular surface 54 on the side axially opposite the branches 42. The surface 52 has an outer diameter D52. The tubular portion 50 also comprises openings 58 for receiving slugs 70, which pass through the insert 40 between the surface 52 and the bore 56, radially to the axis X40, at the interface area 38.

When the slug 70 passes through the tube 20 and the tubular portion 50 of the insert 40, the surface 72 is adjusted in the openings 23 and 58, while the end 74 extends radially protruding outside said opening 58 and the surface 52, thereby allowing the winding 36 of the fibers 34 on said end 74.

The annular portion 60 comprises an outer cylindrical surface 62 and an inner bore 66, which are centered on the axis X40 and connected by a tapered surface 63 and a radial annular surface 64. The surface 62 has an outer diameter D62 that is larger than the diameter D52. Furthermore, the annular portion 60 has a side 67 turned toward the tubular portion 50 and the interface area 38 in the axial direction of the insert 40.

In practice, the side 67 comprises toothed elements 68 and 69, i.e. a regular series of hollow shapes 68 and protruding shapes 69. More specifically, these toothed elements consist of recesses 68 and spurs 69, distributed alternating along the periphery of the insert 40. Each recess 68 formed in the annular portion 60 of the insert 40 is aligned, in the axial direction X40, with one of the openings 58 radially defined in the tubular portion 50 of the insert 40 and provided to receive the slugs 70. Thus, each recess 68 is configured to receive at least one portion of the winding 36 of the fibers 34 around the slugs 70 positioned opposite said recess 68, so as to axially and/or tangentially maintain the fibers 34 between the recess 68, the spurs 69 and the slugs 70 in the interface area 38 when forces are exerted on the shaft 10. This axial maintenance of the fibers 34 makes it possible to block the movement of those fibers 34 in a direction of rotation of the shaft 10, the fibers 34 being blocked by the slug 70 in the other direction of rotation of the shaft 10.

Preferably, each recess 68 defines a concave cylindrical surface 68a, the axis X68 of which is parallel to the axis X70 of the adjacent slug 70, associated with that recess 68. The cylindrical surface 68a also has a radius r68 measured from the axis X68, and a depth p68 measured in the axial direction X40 of the insert 40 from an edge of the recess 68 leading to the spur 69. In particular, the depth p68 of the recess 68 is smaller than the radius r68 of the surface 68a.

The manufacture of the shaft 10 using a production unit UF is described below, in particular relative to FIGS. 3, 6 and 7.

As shown in FIG. 3, this production unit UF comprises a spindle 80 mobile in a rotational movement R80 around an axis of rotation X80, as well as a mobile carriage 90 following a translational movement T90 in a direction with axis X90 parallel to the axis X80.

First, each insert 40 is secured to an end 26 or 28 of the tube 20. More specifically, the tube 20 is fitted into the insert 40, with the surface 22 adjusted in the bore 56. At this stage, the axes X10 and X40 are combined.

Alternatively, the tube 20 can be assembled with production tool kit members that are shaped like the insert(s) 40, but which are separate from the insert(s) 40 ultimately used when the shaft 10 is in operation. For example, such a tool kit member can be a replica of the final insert 40, said replica being made from a less expensive material such as wood or plastic. According to another example, the spindle 80 can be provided with mandrel shaped like the insert 40.

In other words, at least one end member is positioned at one of the ends of the tube 20. This member can be a particular configuration of the insert 40, a replica of the insert 40 or a mandrel shaped like the insert 40. For simplification purposes, hereafter we will consider the insert 40 as end member.

The spindle 80 is then inserted into the bore 66 of the first insert 40, passes through the tube 20 inside the bore 24, then passes through the bore 66 of the second insert 40. The outer diameter of the spindle 80 is provided to be adjusted in the bores 66. At this stage, the axes X10, X40 and X80 are combined. The unit UF also comprises elements, not shown, for rotationally connecting the inserts 40 with the spindle 80.

As shown in FIG. 6, the rotation R80 of the spindle 80 drives the rotation of the shaft 10 around the axis X80. The carriage 90 of the unit UF, on the one hand, comprises a head 92, configured to continuously release a length of fibers 34 and, on the other hand, mobile in translation T90 along the axis T90 when the spindle 80 is rotationally mobile R80. In this way, the unit UF makes it possible to position the fibers 34 around the tube 20, according to the filamentary winding principal, which is known in itself.

In particular, the fibers 34 are wound around the tube 20 while forming a helix inclined by a winding angle β34 relative to the longitudinal axis X10 of the tube 20. Preferably, since the shaft 10 is a torque shaft intended to bear the corresponding stresses, the fiber winding 34 angle β34 in the current portion of the tube 20 is equal to 45°. Alternatively, the angle β34 can be comprised between 20 and 70°, depending on the relative speed of movement of the spindle 80 and the carriage 90.

Furthermore, in the interface area 38, the winding 36 of the fibers 34 forms a "half-revolution" over the tubular portion 50 of the inserts 40. In fact, at the area 38, the carriage 90 changes translation directions T90, while the spindle 80 maintains its rotation R80. To that end, the unit UF must be configured with the required precision for each winding 36 to be formed around the surface 72 with the pin 70, between said pin 70 and the corresponding recess 68.

In other words, the placement of the fibers 34 involves varying the winding angle β34 between the current portion of the tube 20 and the interface area 38. Under these conditions, the angle β34 is comprised between 1 and 90° during the manufacturing method.

Lastly, when the desired quantity of fibers 34 is wound on the tube 20 and the inserts 40, the head 92 stops supplying fibers 34 and the shaft 10 can be removed from the spindle 80. The shaft 10 is then inserted into a molding machine, not shown, of the unit UF.

As shown in FIG. 7, in the molding machine of the unit UF, the resin matrix 32 is formed around the surface 22 of the tube 20 and around the surface 52 of the inserts 40, between the sides 67 in the axial direction of the shaft 10, while incorporating the fibers 34. When the resin 32 dries while capturing the fibers 34, these elements 32 and 34 form the tubular and rigid composite assembly 30. This composite assembly 30 and the tube 20 then form the body 12 of the shaft 10. The configuration of the inserts 40, in particular the openings 58 and the recesses 68, ensures proper orientation of the fibers 34 and confinement of the resin 32 in the event the shaft 10 is stressed.

As an example, the composite assembly 30 used to manufacture the shaft 10 is made up of an epoxy resin matrix 32 having a longitudinal modulus of elasticity in the vicinity of 4 GPa, while carbon fibers 34 have a modulus in the vicinity of 200 to 250 GPa. Since the fibers 34 have a modulus much higher than that of the resin 32, it is the fibers 34 that ensure the rigidity of the composite assembly 30, in particular during the operation of the shaft 10. More specifically, the fibers 34 have optimal behavior in traction and compression, whereas the resin 32 only has good mechanical behavior in compression. In other words, the shaft 10 is designed so that the resin 32 is stressed only in compression.

In practice, the proper mechanical strength of the composite assembly 30 is ensured by the presence of the fibers 34 in the interface area 38, as well as through the work of the resin 32 only in compression.

Alternatively, the composite body 12 of the shaft 10 can be made according to a different manufacturing method without going beyond the scope of the invention. In particular, the composite assembly 30 can be formed while the insert 40 and pins 70 are not placed at the ends 26 and 28 of the tube 20. For example, the composite assembly 30 can be formed by winding fibers 34, then molding resin 32 on a production tool kit provided to that end. Then, after the manufacturing of the body 12, the insert(s) 42 can be incorporated into the shaft 10. In this way, different types of inserts 40 are interchangeable. According to another example, the composite assembly 30 can be formed without using a tube 20.

Hereafter, we will consider the insert 40 situated on the left side of FIG. 7.

When the shaft 10 is stressed in torsion, the fibers 34 are stressed in traction in a direction D1, were in compression in a direction D2.

When the fibers 34 are stressed in traction along D1, they tend to migrate toward the slug 70. The presence of this slug 70 then retains the winding 36 of the fibers 34 and drives a compression of the resin 32.

When the fibers 34 are stressed in compression along D2, they tend to migrate toward the side 67. The winding 36 of the fibers 34 is confined between the recess 68, the spurs 69 and slug 70, while being compressed against the surface 68a of the recess 68. While the fibers 34 are kept in place in the area 38, the resin 32 is compressed against the toothed elements 68 and 69.

Thus, irrespective of the direction of torsion of the shaft 10, but also the traction or compression of the shaft 10, the component elements of the composite assembly 30 are stressed in their working range: the fibers are stressed in traction or compression, while the resin is always stressed in compression. The shaft 10 then has a satisfactory mechanical strength.

Figure 17:
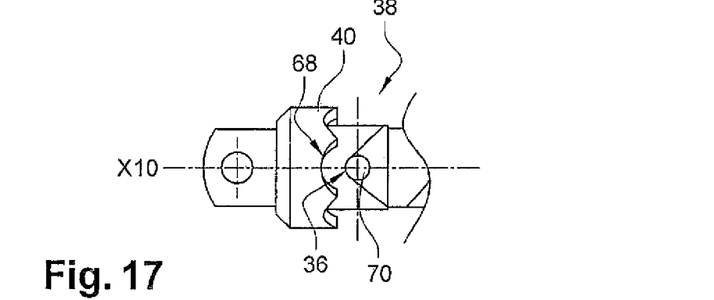
FIG. 17 is a view similar to FIG. 4 showing a single slug 70.

In practice, each insert 40 comprises at least one slug 70 positioned in an opening 38, and at least one recess 68 positioned opposite a corresponding slug 70. If the insert 40 comprises a single slug 70, see FIG. 17, passing through two openings 38, then a recess 68 is provided opposite each end of the slug 70. For optimal operation of the invention, each insert 40 is passed through by several slugs 70 radially distributed around the body 12, preferably six slugs 70. Alternatively, each insert 40 can comprise a different number of slugs 70, preferably an even number for the purpose of simplifying the piercing of the openings 38, for example four or eight slugs 70.

Figure 18:
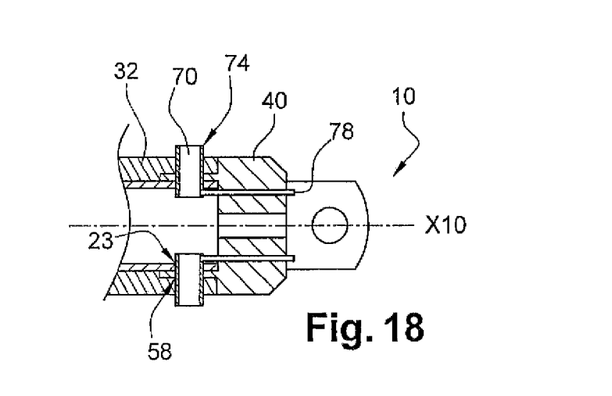
FIG. 18 is a cross-section showing locking pins 78 for slugs 70.

In an alternative not shown in FIGS. 3 to 7 but shown in FIG. 18, the end 74 of each slug 70 protrudes radially outside the composite assembly 30 when the manufacture of the shaft 10 is finished. In that case, the shaft 10 can advantageously comprise removable reversible locking means for locking each lug 70 in the interface area 68 and its opening 58. As an example, these locking means can be pins and/or threaded elements 78, which make it possible to keep the slugs 70 in the openings 58. As a result, the slugs 70 can be removed from the shaft 10 when the shaft is idle when the locking means are unlocked, and the insert 40 can then be removed from the shaft 10. In this way, each insert 40 positioned at one of the ends 16 or 18 of the shaft 10 is interchangeable with another insert of the same type or a different type, depending on the targeted application for the shaft 10. In particular, the removal of the slugs 70 and/or the insert 40 can be done without substantial deformation of the composite assembly 30 at the interface area 38, when the matrix 32 is formed and solidified. As a result, the windings 36 of fibers 34 remain in place even when the slugs 70 are removed, then reinserted into the openings 58. In practice, a change of insert 40 can be done during the manufacture of the shaft 10 or after an extended operating period of that shaft 10.

At this stage, it will be noted that when one of the inserts 40 has been removed from the corresponding end 16, 18 of the shaft 10, the tube 20 can also be removed from the shaft 10 by sliding at that end 16 or 18. In fact, the main function of this tube 20 is to serve as a support on the one hand for the fibers 34 during the winding thereof and, on the other hand, for molding of the resin 32 incorporated those fibers 34, so as to form the composite assembly 30. As a result, when the composite assembly 30 has been formed, the tube 20 can be removed to lighten the shaft 10.

Alternatively, the tube 20 can remain on the shaft 10, so as to reinforce the mechanical strength of the shaft 10.

FIGS. 9 to 16 show a second embodiment of the torque shaft 110 according to the invention.

Certain component elements of the shaft 110 are similar to the component elements of the shaft 10 of the first embodiment, described above, and bear the same numerical reference, increased by one hundred. These are the body 112 elongated along the axis X110 between the ends 116 and 118, the composite assembly 130 including a resin matrix 132 and fibers 134, with windings 136 in the interface area 138, an insert 140 with central axis X140, comprising a tubular portion 150 with a cylindrical surface 152, a radial annular surface 154, a bore 156 and openings 158, and an annular portion 160 with a cylindrical surface 162, a radial annular surface 164, a bore 166 and a side 167 provided with concave cylindrical toothed elements 168 and 169, whereof a recess 168 having a depth p168 and a concave cylindrical surface 168a with axis X168 and radius r168, slugs 170 with axis X170 comprising an outer cylindrical surface 172 and a protruding end 174.

However, the insert 140, the slugs 170 and the interface area 138 have certain differences relative to the first embodiment. A single insert 140 is shown at the end 118 of the shaft 110, the insert positioned on the end 116 not being shown.

The shaft 110 is manufactured using the same method as the shaft 10 of the first embodiment. The inserts 140 are positioned at the end of a metal tube, not visible in FIGS. 9 to 16, then the slugs 170 pass through the inserts 140 and the tube. Fibers 134 are then wound in a helix around the tube, and wound around the slugs 170 in the interface area 138, then the resin 132 is formed around the tube. The body 112 of the shaft 110 is thus formed, including the composite assembly 130. The metal tube can be removed or left in place in the shaft 110.

Alternatively, the body 112 of the shaft 110 can be manufactured before positioning of the insert(s) 140, using a production tool kit provided to that end.

Figure 15:
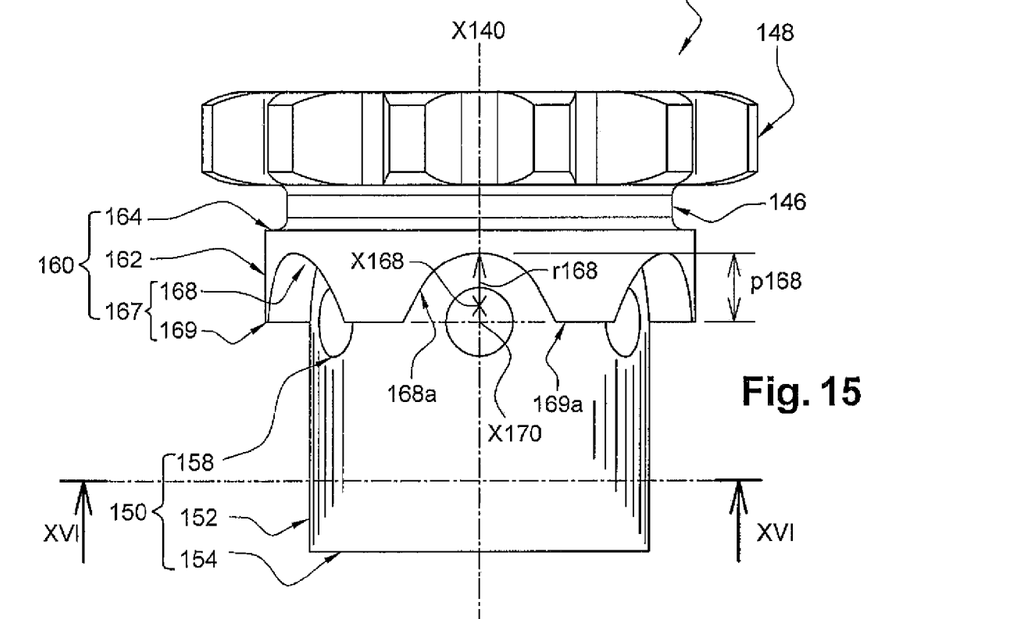
FIG. 15 is an elevation view of the insert equipping the shaft of FIGS. 8 to 12.
Figure 16:
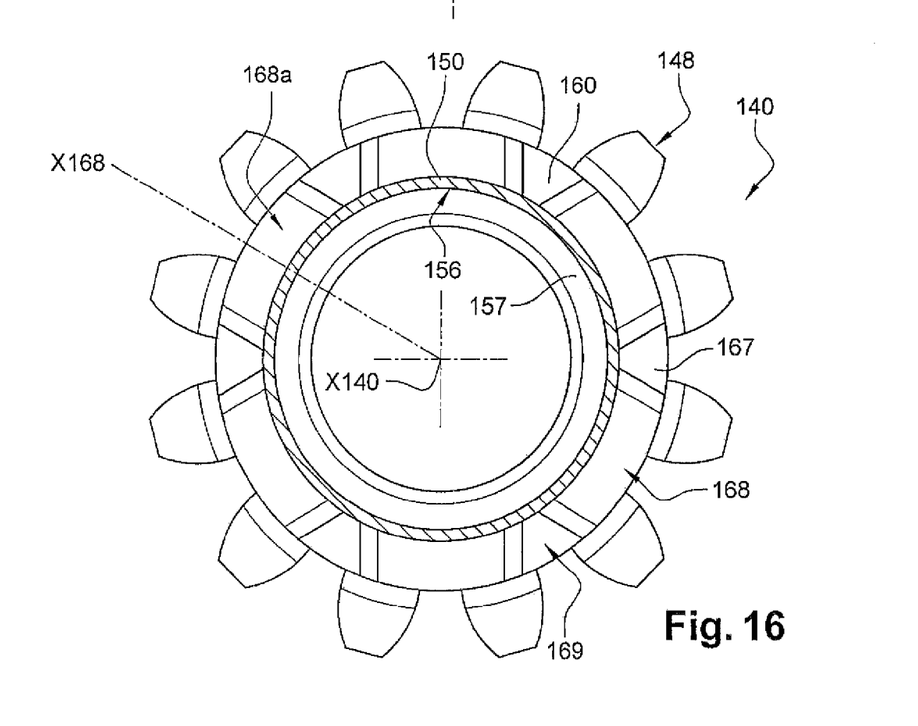
FIG. 16 is a cross-section along line XVI-XVI of FIG. 15.

The insert 140 is shaped in a gear, within annular groove 146 and toothed elements 148, situated on the side opposite the tubular portion 150 in the axial direction X140 of the insert 140. At the inner bore 156, this tubular portion 150 has an annular protrusion 157 passed through by the openings 158. The depth p168 of each recess 168 is larger than the radius r168 of the surface 168a. The spurs 169 are shaped like notches, with a flat radial surface 169a. In the interface area 138, the composite assembly 130 fits the shape of the recesses 168, between the spurs 169.

The axes X170 of the slugs 170 are situated in a plane, perpendicular to the axis X140, which is defined by the set of surfaces 169a. The slugs 170 are hollow, with an inner cylindrical bore 176.

Figure 8:
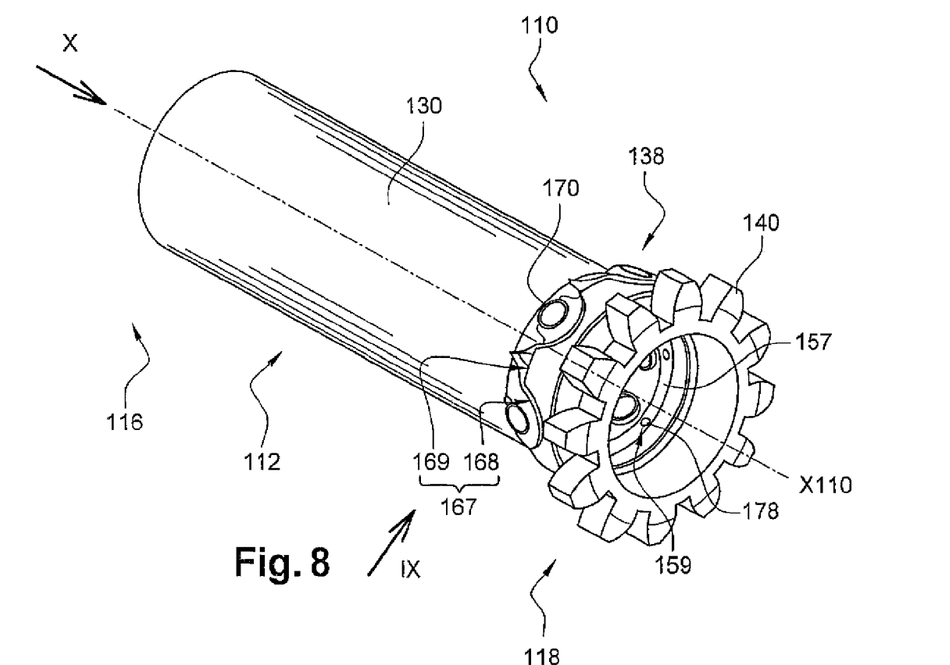
FIG. 8 is a partial perspective view of a second embodiment of the shaft according to the invention.
Figure 9:
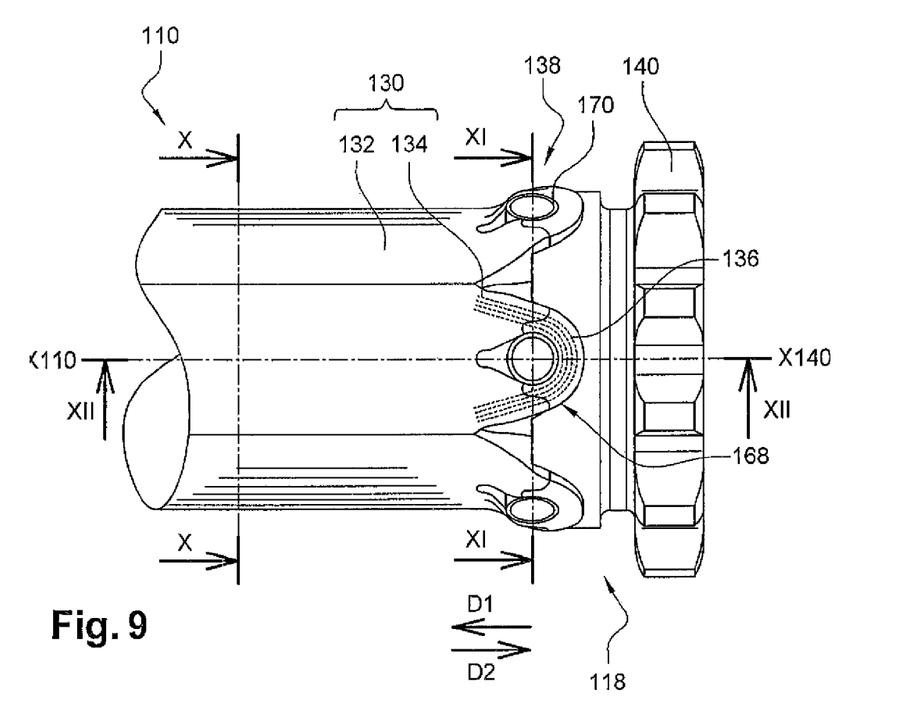
FIG. 9 is an elevation view of the shaft along arrow IX of FIG. 8.
Figure 10:
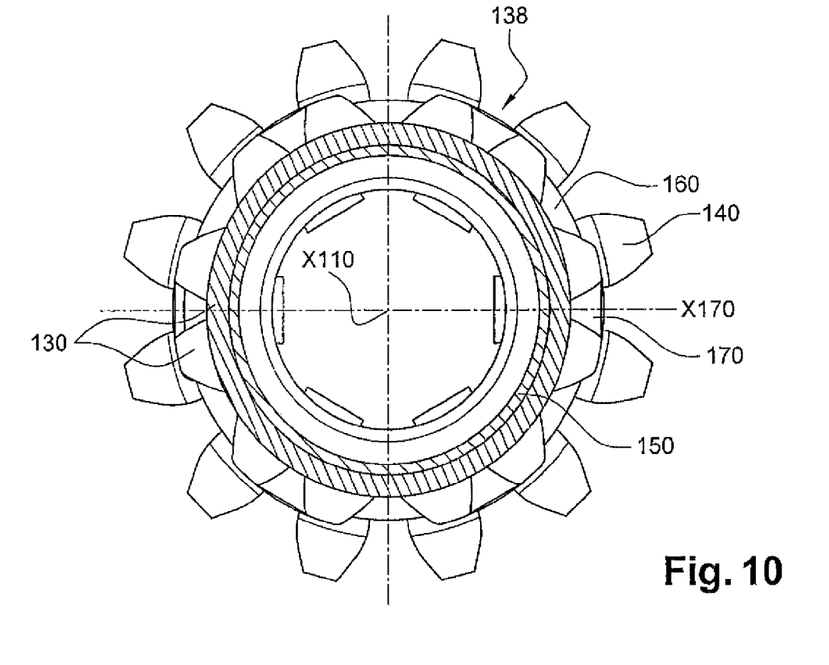
FIG. 10 is a cross-section along line X-X of FIG. 9.
Figure 11:
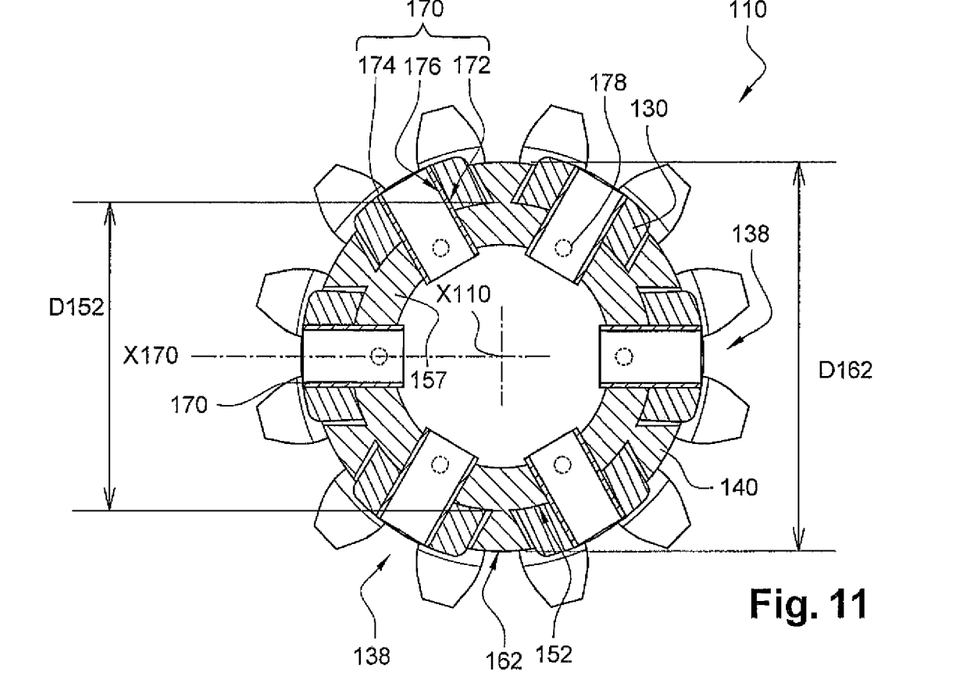
FIG. 11 is a cross-section along line XI-XI of FIG. 9.
Figure 12:
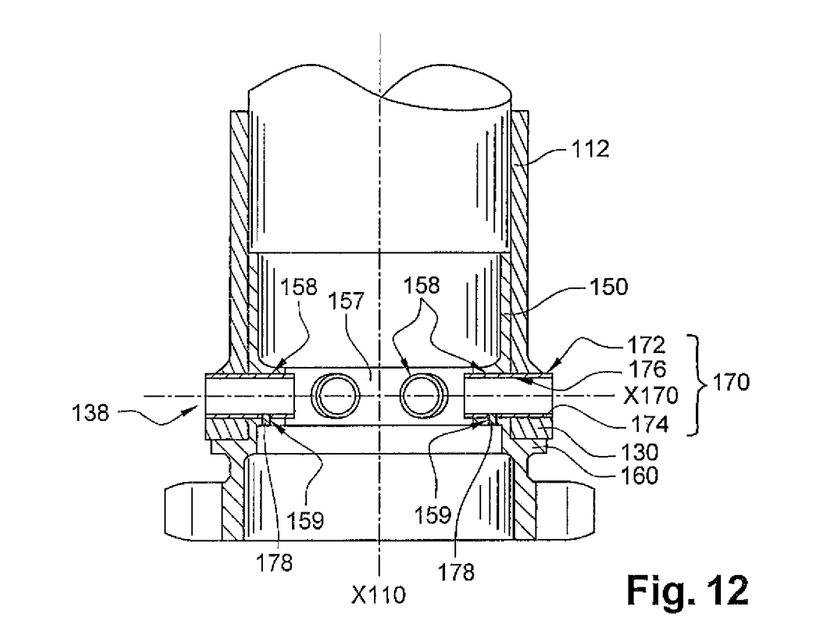
FIG. 12 is a cross-section along line XII-XII of FIG. 9.

As shown in FIGS. 8 and 12, openings 159 are formed, in the axial direction X140, in the inner annular projection 157 of the insert 140. Pins 178 are inserted into those openings 159 and cooperate with the slugs 170 to connect them to the insert 140. Preferably, the openings 159 are tapped and the pins 178 are threaded. When a pin 178 is screwed into the tapped opening 159, that pin 178 bears on the surface 172 of the corresponding slug 170, so as to secure that slug 170 with the insert 140.

In one alternative that is not shown, the pins 178 can be housed in an opening provided to that end in each slug 170, while penetrating the bore 174. In that case, the angular positioning of the slugs 170 around the axis X170 must be done precisely.

In other words, the pins 178 constitute removable reversible locking means of the slugs 170 in the insert 140. Thus, the insert 140 can be changed to adapt to a particular application of the shaft 110, or in cases of wear. First, this change consists of unlocking the pins 170, removing each slug 170 passing through the insert 140 in the interface area 138, and removing that insert 140 from the end 118 of the shaft 110.

Figure 13:
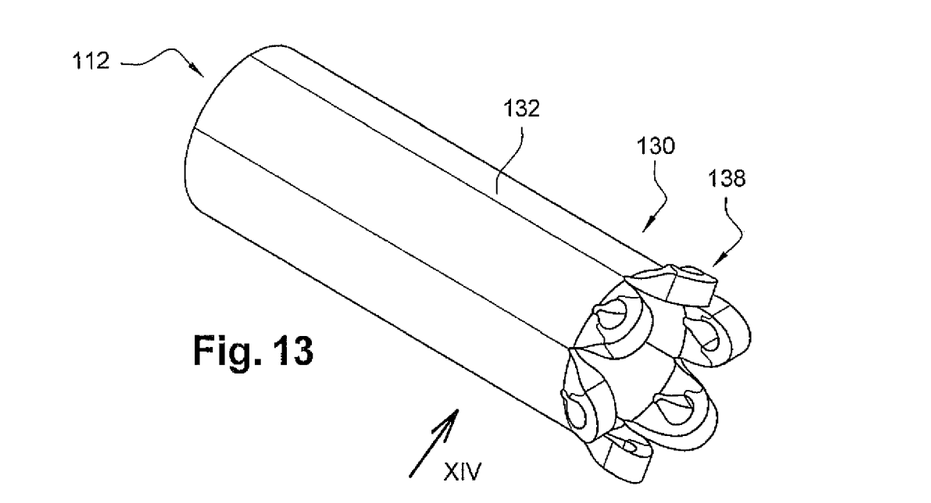
FIG. 13 is a partial perspective view of the body of the shaft of FIGS. 8 to 12.
Figure 14:
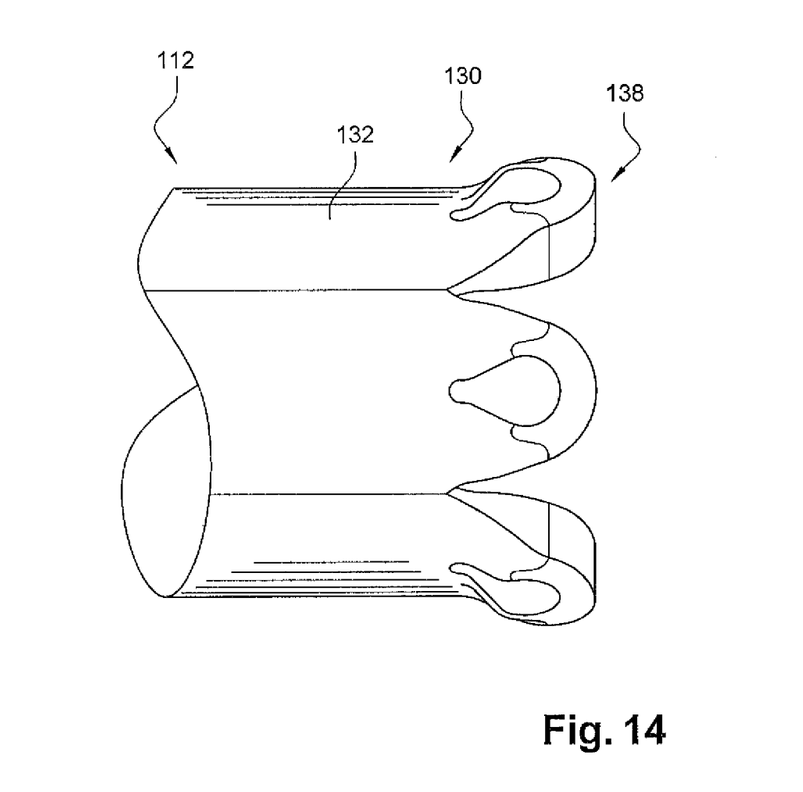
FIG. 14 is a larger scale perspective view along arrow XIV of FIG. 13.

At that stage, the end 118 of the body 112 comprising the composite assembly 130 is free, as shown in FIGS. 13 and 14. In particular, the removal of the slugs 170 and/or the insert 140 can be done without substantial deformation of the composite assembly 130 at the end 118 and the interface area 138, while the resin matrix 132 is solidified. Thus, the windings 136 of fibers 134 remain in place even when the slugs 170 are removed, then reinserted into the openings 158.

Subsequently, a new insert 140 is placed at the end 118 of the shaft 110, each slug 170 previously removed is repositioned in the interface area 138 through the new insert 140, and lastly the pins 178 are repositioned and locked relative to each slug 170.

In practice, as in the first embodiment, the proper mechanical strength of the composite assembly 130 is ensured by the presence of fibers 134 in the interface area 138, as well as by the compression work of the resin 32. When the shaft 110 is stressed in torsion, the fibers 134 are stressed in traction in a direction D1, or in compression in a direction D2. The configuration of the inserts 140, in particular the openings 158 and the recesses 168, ensures proper orientation of the fibers 134 and confinement of the resin 132 in the interface area 138 in the event the shaft 110 is stressed.

Furthermore, the technical features of the various embodiments may be combined with one another in whole or in part. For example, the inserts, the toothed elements, the slugs and/or the locking means of the slugs on the inserts can have different configurations. Thus, the shaft according to the invention can be adapted to any specific application, in particular in terms of functionality and cost.

The invention claimed is:

1. A transmission shaft transmitting rotational movements and/or forces, comprising:

a tubular body elongated along a longitudinal axis between two ends and including at least one tubular composite assembly, including a plastic matrix and strengthening elements, at least one insert which is positioned at one of the longitudinal ends of the body and which is mechanically secured to the body in an interface area between the insert and the composite assembly, and in each interface area, at least one slug passing radially through the insert and the body, wherein the strengthening elements at least partially surround the at least one slug such that the at least one slug keeps the strengthening elements in place in the interface area during the manufacture of the shaft and/or when forces are exerted on the shaft, and wherein the at least one insert includes:

at least one recess receiving at least one part of the strengthening elements surrounding the at least one slug, so as to axially and/or tangentially maintain the strengthening elements between the at least one recess and the at least one slug in the interface area a tubular portion centered on a central axis, having a first outer diameter, an annular portion coaxial to the tubular portion, having a second outer diameter larger than the first outer diameter and wherein one side oriented toward the tubular portion in the axial direction of the insert is provided with the at least one recess, and toothed elements which include the at least one recess and which are distributed along the periphery of the insert, on the side of the annular portion oriented toward the tubular portion.

2. The shaft according to claim 1, wherein for each recess formed in the annular portion of the at least one insert, an opening for receiving a slug is radially defined in the tubular portion of the insert and is substantially aligned with the recess in the axial direction of the at least one insert.

3. The shaft according to claim 1, including reversible locking means for locking the at least one slug in the interface area, wherein the at least one slug can be removed from the shaft at rest when the locking means are unlocked, and wherein the at least one insert can be removed from the shaft at rest when the at least one slug passing through the insert and the body has been removed from the shaft.

4. The shaft according to claim 1, wherein the at least one insert is passed through by a plurality of slugs that are radially distributed around the body.

5. The shaft according to claim 4, wherein there are six slugs radially distributed around the body.

* * * * *